No. 721,961. PATENTED MAR. 3, 1903.
L. MARCKWALD.
PROCESS OF HALOGENIZING ORGANIC FLUIDS.
APPLICATION FILED AUG. 21, 1902.
NO MODEL.

Witnesses
P. F. Smith
M. H. McGown

Inventor
Leo Marckwald
By Knight Bro.
Attys.

UNITED STATES PATENT OFFICE.

LEO MARCKWALD, OF CHARLOTTENBURG, GERMANY.

PROCESS OF HALOGENIZING ORGANIC FLUIDS.

SPECIFICATION forming part of Letters Patent No. 721,961, dated March 3, 1903.

Application filed August 21, 1902. Serial No. 120,502. (No specimens.)

*To all whom it may concern:*

Be it known that I, LEO MARCKWALD, doctor of philosophy, a subject of the King of Prussia, German Emperor, residing at 35 Weimarerstrasse, Charlottenburg, Kingdom of Prussia, German Empire, have invented new and useful Improvements in Processes of Halogenizing Organic Fluid Substances, of which the following is a specification.

The invention relates to the manufacture of organic halogen compounds from fluid organic substances.

Hitherto it has been impossible to avoid in the production of organic halogen compounds that a larger amount than desired of halogen atoms would enter into the molecule of the substance to be treated. If one intended, for instance, to produce from toluol ($C_6H_5CH_3$) by the action of chlorin benzylchlorid, ($C_6H_5CH_2Cl$), benzalchlorid ($C_6H_5CHCl_2$) and benzotrichlorid ($C_6H_5CCl_3$) were formed by the first action of the chlorin on toluol, where, as in the production of benzalchlorid ($C_6H_5CHCl_2$) from benzylchlorid, ($C_6H_5CH_2Cl$) also benzotrichlorid ($C_6H_5CCl_3$) was formed from the beginning of the process. The said higher chlorinated by-products rendered the manufacture of the halogen compound that one wished to obtain in a pure state difficult.

The object of this invention is to avoid the above-stated difficulties and to enable the introduction of a certain number of halogen atoms into fluid organic substances, whereby the organic halogen compounds may be obtained free from higher chlorinated organic compounds.

This process consists in that I cause during the halogenizing process constantly fresh raw material to be exposed to the action of the halogen and that the halogen compound formed in a small quantity is withdrawn simultaneously with the unattacked raw material from the further action of the halogen. In my process, therefore, the unattacked raw material is in a large surplus with reference to the amount of halogen. The raw material is only a short time exposed to the action of the halogen. Therefore only a small proportion of the raw material is converted into the halogen compound. From the mixture of raw material and halogen compound resulting in the process I separate the raw material, which is subjected again to the action of the halogen and the halogen compound, which I may purify when desired.

I may carry out my process in using an apparatus illustrated in the accompanying drawings, in which—

Figure 1:
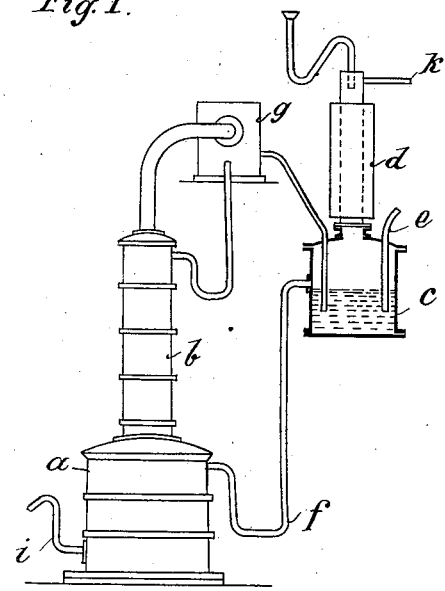
Figure 2:
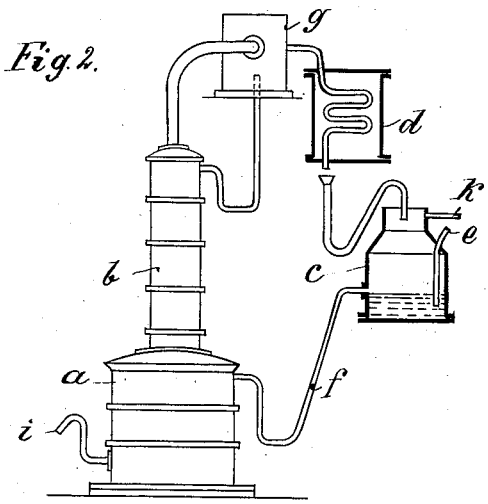

Figure 1 is a view partly in vertical section; Fig. 2, a view of a modification of my apparatus.

Similar letters refer to similar parts throughout both views.

*a* is a still of suitable construction.

*b* is the rectification-column, preferably composed of several chambers communicating with each other by overflow-tubes placed on the top of the still *a;* *c*, the vessel, of suitable form, in which the action of the halogen on the organic compound to be treated is carried out, which vessel I shall designate as "halogenizing" vessel.

*d* is a reflux-condenser.

*e* is the tube leading the halogen into the vessel *c*.

*f* is a reflux-tube.

*g* is the condensing apparatus.

*h* is the tube leading the material to be treated into the apparatus.

*i* is the overflow-tube.

*k* is the tube carrying away the hydrohalogen acid formed in the process.

I describe the manner in which I carry out my process in describing the production of benzylchlorid ($C_6H_5CH_2Cl$) from toluol, ($C_6H_5CH_3$.) I place in the still *a* a suitable amount of toluol—say fifty kilos—and a suitable amount of a halogenizing agent—say 0.5 kilos phosphorus trichlorid ($PCl_3$)—and heat in suitable manner the mixture, so that the vapors of the said substance enter through the column *b* and the condensing apparatus *g* into the vessel *c*, in which the action of the halogen on the toluol ($C_6H_5Cl_3$) to be treated is to be carried out, and from the said vessel *c* into the reflux-cooler *d*, in which latter a condensation of the vapor is effected. The toluol returning fills the vessel *c* by being maintained to boiling temperature by the toluol-vapors. If the level of the toluol attains the reflux-tube *f*, the toluol returns by the said tube *f* into the still *a*. Now I introduce by the tube *e* chlorin into the liquor until a thermometer placed in the condensing apparatus *g* shows a temperature above the boiling-point of toluol—i. e., 111° centigrade—and indicates the chlorination of the toluol to be treated has been finished, so that in the still $a$ exclusively or nearly exclusively the chlorination product is present. Now I introduce by the tube $k$ an amount of toluol equivalent to the amount of chlorin introduced in the same time into the apparatus. The toluol introduced is mixed with the toluol present in the vessel $c$ and refluxes with the latter quoted amount of toluol, so that as the toluol continuously is vaporized the still $a$ is filled with benzylchlorid that flows away by the tube $i$. The product so obtained may be purified by a rectifying process—for instance, by fractional distillation. In the described apparatus all organic fluid substances that are to be halogenized at boiling temperature may be treated. One may produce in the described apparatus benzalchlorid ($C_6H_5CHCl_2$) from benzylchlorid, chlorin acetic acid ($CH_2Cl.COOH$) from acetic acid, ($CH_3COOH$,) chlorin malonic acid, $CHCl(CO_2H)_2$, or bromin malonic acid, $CHBr(CO_2H)_2$, from malonic acid, $CH_2(CO_2H)_2$, in substituting benzylchlorid, acetic acid, malonic acid for toluol, or bromin for chlorin in the described example. I may also introduce the fluid from the halogenizing vessel $c$ into a chamber of the column $b$ instead of introducing it into the still $a$. By this modification I obtain the effect that the condensing apparatus may work less, whereby fuel is economized.

If I intend to carry out the halogenizing process instead of at the boiling temperature of the substance to be treated, as described, at a lower temperature, as would be required for the manufacture of chlorinbenzol ($C_6H_5Cl$) from benzol, ($C_6H_6$,) I use the apparatus illustrated in Fig. 2 of the accompanying drawings. I introduce the condensed vapors instead of the vapors into the halogenizing vessel $c$. For effecting this I interpose between the condensing apparatus $g$ and the halogenizing vessel $c$ a cooler $d'$ and lead the vapors coming from the condensing apparatus $g$ through the cooler $d'$ before they enter the vessel $c$. Besides the quoted modification the process is carried out in a manner analogous to the described production of benzylchlorid from toluol.

Instead of one vessel for carrying out the action of the halogen on the organic substance I may also use several vessels that are in communication with one still, from which they are charged in the same time or intermittently.

What I claim as my invention, and desire to secure by Letters Patent, is—

1. Process for halogenizing organic fluid substances, especially for introducing a certain number of halogen atoms into the molecule of the said substances, consisting in that a certain portion of the substances is treated with halogen, new portions of the substances to be treated are continuously subjected to the action of halogen, and the mixture so obtained of unattacked substances and halogenized substances is continuously withdrawn from the further action of the halogen, so that during the halogenizing process the proportion of the unattacked substances is very large with reference to the halogen.

2. Process for halogenizing organic fluid substances, especially for introducing a certain number of halogen atoms into the molecules of the said substances, consisting in that a certain portion of the substances is treated with halogen, new portions of the substances to be treated are continuously subjected to the action of halogen, the mixture so obtained of unattacked substances and halogenized substances is continuously withdrawn from the further action of the halogen, the halogenized substances are separated from the mixture and the unhalogenized substances are subjected continuously to the action of halogen.

In testimony whereof I have signed my name to this specification in the presence of two subscribing witnesses.

LEO MARCKWALD.

Witnesses:
HENRY HASPER,
WILLIAM MAYNER.